United States Patent Office 2,914,384
Patented Nov. 24, 1959

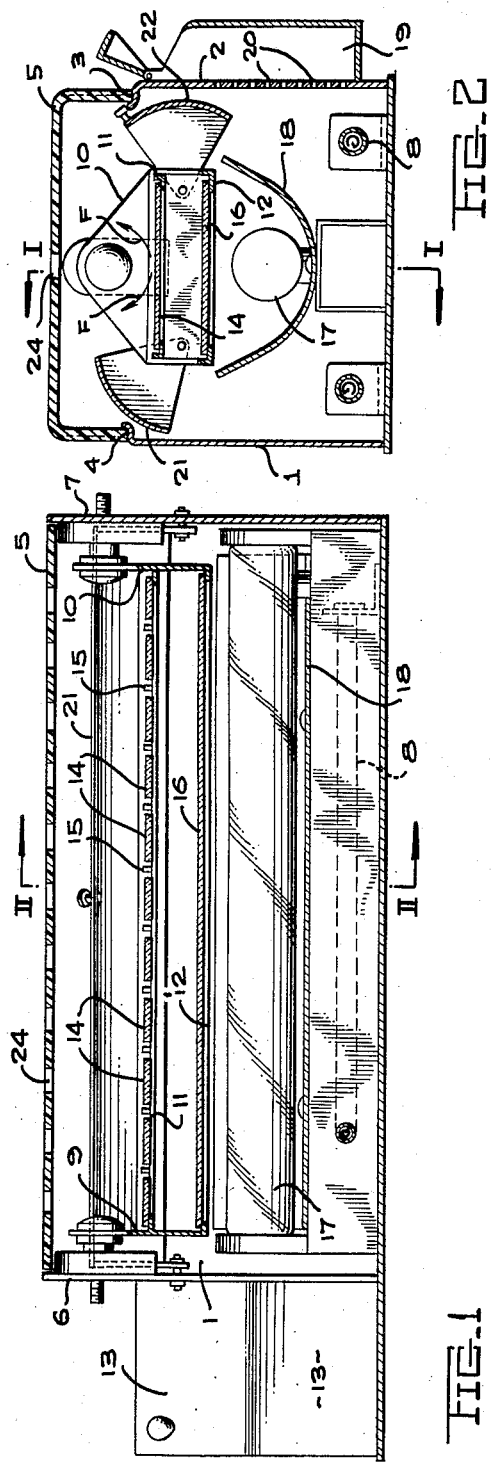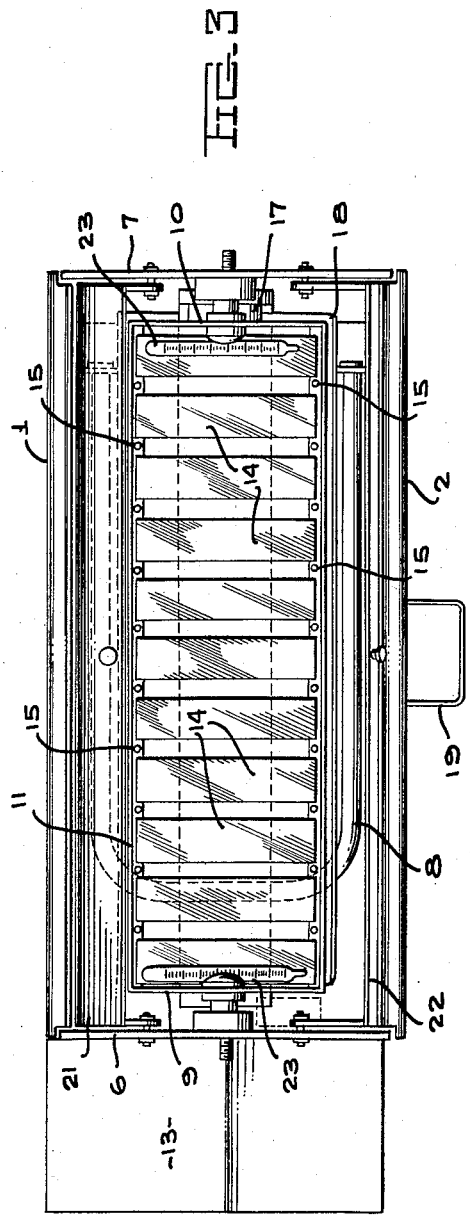

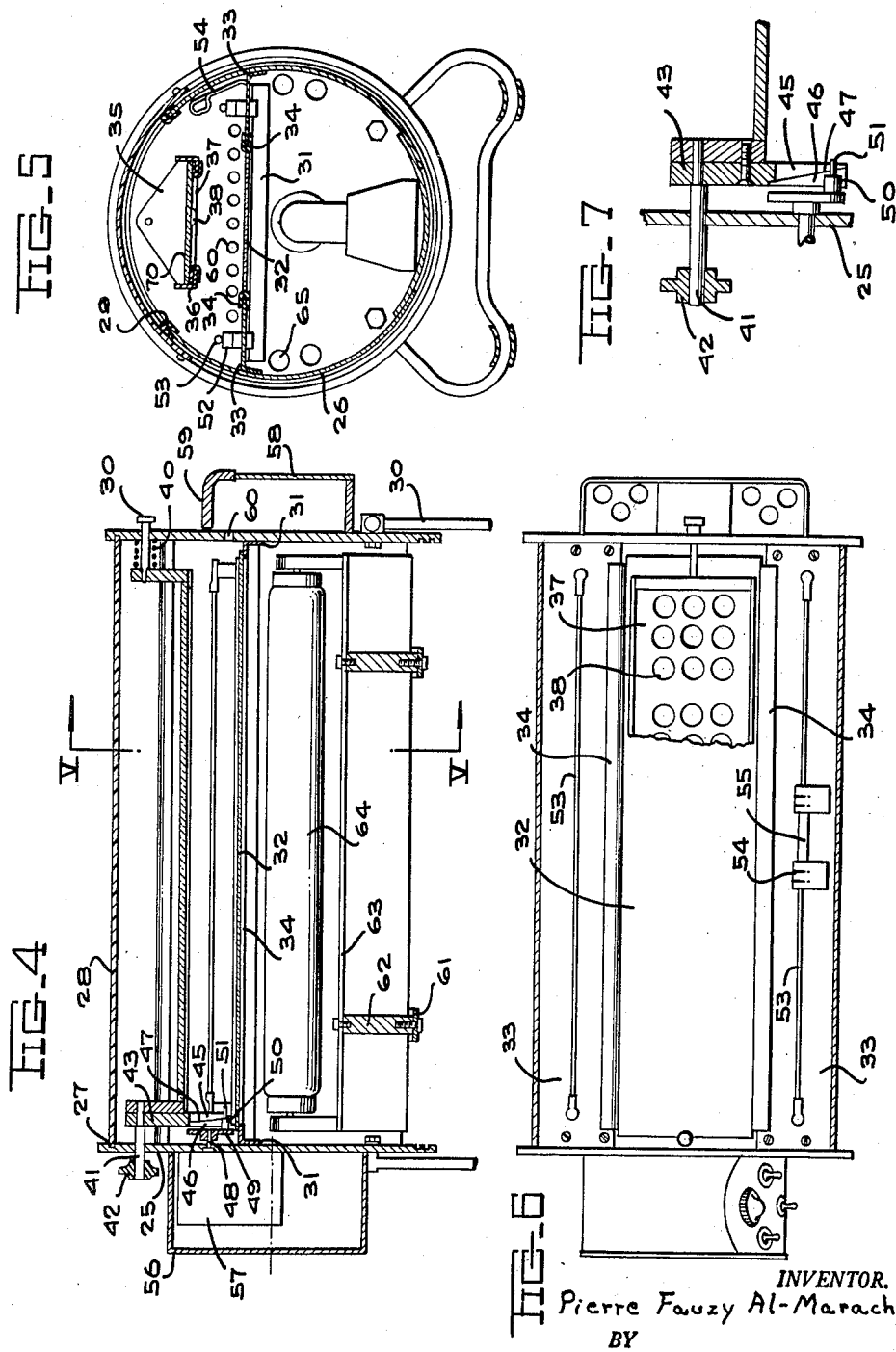

2,914,384

APPARATUS FOR EFFECTING CHEMICAL REACTIONS ON GLASS OR LIKE PLATES

Pierre Fauzy Al-Marachy, Paris, France

Application July 21, 1955, Serial No. 523,551

Claims priority, application France July 22, 1954

5 Claims. (Cl. 23—253)

In the practice of serology and hematology, it is usual to effect on glass plates, reactions which result in changes of appearance detectable by eye. There are indeed other reactions which are conventionally carried out in tubes but could as well be effected on glass plates and would then require but minute amounts of reactants.

A difficulty which has been met is to arrange so that the plate and the substances laid thereon are kept at a constant temperature higher than room temperature in temperate countries, in particular at 37° C., and that at the same time the plate is subjected to stirring motion.

It is an object of this invention to obviate such a difficulty, a more particular object being to provide an apparatus in which it is possible to effect reactions, including so-called "microreactions" at a constant, controlled temperature on a plate or plates which at the same time may be subjected to a stirring motion.

According to this invention, there is provided an apparatus wherein a plate carrier is supported with possibility of mechanical stirring motion behind a transparent pane, within an enclosure provided with heating means for maintaining a substantially constant temperature therein, and means for illuminating the plate or plates on the carrier with cold light.

With an apparatus thus constructed, the plate or plates may be maintained at an unvarying temperature which is not disturbed by the illuminating means, and be given a stirring motion; in addition the user may observe any reaction or changes as occur on the plate or plates without taking the plates off the influence of constant temperature.

According to a preferred embodiment of this invention, the plate carrier comprises a frame arranged to support the plate or plates through opposite edges thereof, and it is coupled with control means for rocking said frame about a substantially horizontal axis. The cold light source may be for example a mercury vapour lamp supported below the carrier having a transparent plate or plates thereon.

A light diffusion screen is preferably interposed between the cold-light source and the plate carrier. The screen may be attached to the plate carrier so as to be movable therewith. Alternatively the screen may be a portion of a stationary transverse partition, extending across the apparatus casing, to divide the same into two separate chambers or sections, viz. an upper section containing the plate carrier supported therein for rocking motion and heating means, and a lower section containing the light source.

The transparent pane may be constructed as a lid for an open-top casing and in that case, it is desirably provided with holes, the member and positions of which correspond to the number and positions of plates or reaction zones on the plate or plates, so that the user may for example, deposit reagents on the plate or plates with a pipette or like instrument passed through the holes.

Alternatively, the transparent pane may be held for sliding movement in the apparatus casing, and in that case it may be unperforated.

While the plate or plates may have a smooth exposed surface on which to effect reactions, it is desirable to provide shallow recesses on the plate or plates for effecting separate reactions therewith. In that connection one plate may be placed on the plate carrier, said plate having on its exposed face several separate series of recesses, for example nine recesses in each series, where it is be used for determining the blood characteristics of individuals (blood groups A, B or O, Rhesus-factor etc.).

The enclosure within the apparatus casing which is to be kept at a constant temperature may comprise a secondary compartment or may be associated with a secondary casing arranged to be in heat equilibrium with the remainder of said enclosure and to receive reactant tubes or flasks, instruments such as pipette and other ancillary devices in order that the introduction of such instruments or recipient contents into the remainder of the enclosure does not result in any substantial heat supply or removal which might disturb the heat equilibrium therein.

The invention will now be illustrated by the following description when taken in conjunction with the accompanying drawings in which:

Fig. 1 is an elevation view of an apparatus according to this invention, partly in section along line I—I on Fig. 2.

Fig. 2 is a cross-section taken along line II—II on Fig. 1.

Fig. 3 is a corresponding plan view, the lid being removed.

Fig. 4 is an elevation view, similar to Fig. 1, of a modification of the apparatus.

Fig. 5 is a cross-section taken along line V—V on Fig. 4.

Fig. 6 is a partly sectional corresponding plan view.

Fig. 7 is an enlarged sectional view of the control block assembly shown in Fig. 1.

Referring to Figs. 1 to 3, the enclosure adapted to be maintained at a substantially constant temperature and containing the plate-carrier, is provided in an elongated open top box, in which opposite longitudinal walls 1, 2 have top, inwardly directed flanges 3, 4 to support a U-shaped lid 5 which is encased between the other two walls 6, 7 of the box; lid 5 may be made of a transparent plastic material such as poly methyl methacrylate. Provided within the box are controllable heating means which according to the showing comprise a U-shaped electric resistor 8 supported on the bottom of the box.

Arranged in the upper portion of the box, is a plate-carrier comprising a pair of longitudinally spaced-apart, transverse arms 9, 10 supported for rocking movement about a horizontal axis. Arms 9, 10 are interconnected by two couples of longitudinal rails 11, 12 having inward flanges and defining two vertically spaced-apart frames. The rocking blade-carrier thus formed is coupled through a movement transmitting connection (not shown) with a motor in a casing 13 which is provided at an end of the box, so as to be imparted from said motor a continuous rocking movement as indicated by arrows F on Fig. 2.

Resting on the upper frame (rails 11) are glass plates 14, arranged transversely, side by side, with their ends lying on rails 11 between spacers 15. Resting on the lower frame (rails 12) is a ground glass plate 16.

Supported in the box below the blade carrier are a mercury vapour lamp 17 or a like source of cold light, and a cylindrical reflector 18 arranged underneath.

Arranged along one of the box walls, to wit wall 2 according to the showing, is a compartment 19 for receiving for example reactant containers, pipettes and the like, wall 2 being apertured as at 20 so that the inner space in compartment 19 is in heat equilibrium with the enclosure in the box.

As shown, the box may have inner, cylindrical baffles 21, 22 supported on side walls 6, 7 for pivotal movement about horizontal axes so that they can be swung up or down to control the direction of flow of hot air rising from the lower part of the box.

Provided through lid 5 are a number of apertures 24 through which a pipette or like instrument may be passed for depositing reactants on plates 14; the number of apertures 24 and the spacings thereof correspond to the number and spacings of plates 14. The enclosure may contain thermometers such as thermometers 23 on the upper frame of the plate carrier.

Referring to Figs. 4 to 6, the apparatus comprises a cylindrical box or casing including a pair of end plates 25 and a pair of longitudinal, semi-cylindrical walls 26 secured together. Formed in each one of the adjacent faces of end plates 25 is a circular groove 27, extending around the semi-cylindrical walls 26, coaxially therewith, for receiving the transverse ends of a transparent lid 28, which has such a circumferential extent as completely to close the gap between the upper edges of walls 26; arranged to encase said upper edges are U-shaped rubber or like strips 29, providing a rsilient, airtight packing between lid 28 and walls 26. The lid 28 can thus be swung round to clear the gap referred to, then back to close it; as shown the lower edge of groove 27 is omitted at the lower part of end plates 25 so that the lid 28 swung down there can then be withdrawn.

Secured to end-plates 25 are supporting feet 30.

Fixed to the inner faces of side plates 25 are two transverse brackets 31 for supporting the transverse ends of a transparent or translucent plate 32 preferably made of ground glass. Coextensive with the longitudinal walls 26 and secured thereto are a pair of spaced-apart brackets 33, the adjacent edges of which are encased in U-shaped rubber or like strips 34 providing resilient, air-tight packings along the longitudinal edges of plate 32; the combination of the brackets 31, 33, packing strips 34 and plate 32 provides an air tight partition across the casing, dividing the same into two separate superimposed chambers.

Arranged for rocking and reciprocating motion in the upper chamber is a plate carrier comprising a frame made of a pair of transverse substantially triangular arms 35 and a pair of longitudinal rails 36, secured thereto, having inwardly directed flanges encased in U-shaped rubber or like strips 70. Lying on said flanges is a transparent or translucent plate 37 having shallow recesses 38 in its upper face to define a multiplicity of reaction areas; the recesses are grouped as shown to form several series of 9 recesses. Fast with the right-end arm 35 is a pin 39 rotatably borne in the corresponding end plate 25, with a coil spring 40 around said pin between plate 25 and arm 35 to urge the plate carrier leftwards. Fast with the elft-hand arm 35 is another pin 41, rotatably borne in the corresponding end plate 25 and having a hand control button 42 fixed thereto by a transfixing pin so that the plate-carrier can be rocked and/or pushed rightwards manually.

As shown in Fig. 1 and in greater detail in Fig. 7, fast with the left hand arm 35 is a control block 43 having a double vertical slit in its lower part; said slit comprises a narrow portion 45 and a wider portion 46 with an incline 47 between the same. Rotatably borne in the corresponding end plate 25 is a driving shaft 48 having a disc 49 keyed thereon; eccentrically projecting from disc 49 is a pin comprising a relatively thick portion 50 engaging the slit wider portion 46 and having its rounded outer end in abutment against the incline 47; projecting from the outer end of portion 50, is a relatively thin portion 51 engaging the slit narrow portion 45; it will readily be understood that as shaft 48 rotates and carries pin 50, 51 round, the plate carrier is imparted both a rocking motion and a reciprocating motion.

Fixed on supports 52 projecting from brackets 33 are heating resistors 53. On one of the brackets 33 are also secured lugs 54 to support a thermostat 55 for controlling the supply of electric energy to the resistors.

Attached to the left hand side plate 25 is a secondary casing 56 containing an electric motor 57 for driving shaft 48 and auxiliary devices such as a current intake plug and electric switches.

Attached to the right-end side plate 25 is another secondary casing 58 having a swinging lid 59, for receiving auxiliary instruments such as pipettes and reactant containers; the inner space of casing 58 is in open communication with the upper chamber of the main casing through apertures 60.

Extending across the main casing, between walls 26 are metal strips 61, secured thereto and from which columns 62 screwed therein project upwardly to bear the support 63 for an electric illuminating lamp 64 in the lower chamber of the main casing. Apertures 65 are provided through end plates 25 below partition 31, 32, 33, 34 for free ingress and egress of air.

It should be understood that this invention is not restricted to the embodiment thereof illustrated by the drawings. For example the plate carrier may be imparted a stirring motion otherwise than by being rocked about a horizontal axis. Again heating may be effected otherwise than by means of an electrical resistor, for example by means of a heating fluid. Furthermore the apparatus may be equipped with additional auxiliary instruments such as a chronometer.

What I claim is:

1. An apparatus for effecting reactions on a reaction plate, which comprises a casing having an open top; a movable, transparent lid on said open top; packing means between said casing at the top thereof and said lid to provide a substantially air-tight seal between the same; a substantially air-tight partition including a light-permeable portion across said casing below the top thereof, to divide the same into a confined upper section and a lower section; a plate-carrier in said upper section having an openwork frame borne in said casing for rocking movement about a horizontal axis; means including a motor supported from said casing for imparting a rocking motion to said plate-carrier; a light permeable reaction plate laid on said openwork frame for receiving reactants on its top surface; controllable heating means for maintaining a substantially constant temperature in said upper section of said casing; and a source of cold light in said lower section for illuminating said reaction plate through said light-permeable portion of said partition.

2. The apparatus of claim 1, said controllable heating means comprising at least one electric resistor and a thermostat to control the supply of electric energy to said resistor, both supported from said casing in said upper section thereof.

3. The apparatus of claim 1, said partition comprising means fast with said casing below the top thereof, providing an apertured transverse frame therein, a light-permeable pane on said transverse frame, and packing means between said transverse frame and said light permeable pane to provide a substantially air-tight seal between the same.

4. The apparatus of claim 1, said plate-carrier openwork frame comprising a pair of spaced-apart parallel transverse arms, and a pair of spaced-apart parallel longitudinal rails, connecting said arms together, each of which has an inturned flange, and a resilient U-shaped packing arranged to encase each flange, to provide a resilient support for the opposite edges of said light permeable reaction plate.

5. An apparatus for effecting reactions on a reaction plate, which comprises a casing having an open top; a movable, transparent lid on said open top; packing means between said casing at the top thereof and said lid to provide a substantially air-tight seal between the same; a substantially air-tight partition including a light-permeable portion across said casing below the top thereof, to divide the same into a confined upper section, and a lower section; a plate-carrier in said upper section having an openwork frame which comprises a pair of coaxial pins at opposite ends thereof, rotatably and slidably borne in opposite walls of said casing; a motor supported from said casing, having a driving shaft; coupling means operatively interposed between said driving shaft and said plate-carrier openwork frame, for rocking said openwork frame and simultaneously reciprocating the same along the axis of said coaxial pins; a light permeable reaction plate laid on said openwork frame for receiving reactants on its top surface; controllable heating means for maintaining a substantially constant temperature in said upper section of said casing; and a source of cold light in said lower section for illuminating said reaction plate through said light-permeable portion of said partition.

References Cited in the file of this patent

UNITED STATES PATENTS

| | | |
|---|---|---|
| 2,041,290 | Jackson | May 19, 1936 |
| 2,417,802 | Longstreet | Mar. 18, 1947 |